US012134922B2

(12) United States Patent
Garneau

(10) Patent No.: US 12,134,922 B2
(45) Date of Patent: Nov. 5, 2024

(54) ELECTROMECHANICAL HANDLE LOCKING CAM LATCH WITH KEYED MECHANICAL OVERRIDE

(71) Applicant: Southco, Inc., Concordville, PA (US)

(72) Inventor: Gregory Gilbert Garneau, Berlin, NJ (US)

(73) Assignee: Southco, Inc., Concordville, PA (US)

( * ) Notice: Subject to any disclaimer, the term of this patent is extended or adjusted under 35 U.S.C. 154(b) by 745 days.

(21) Appl. No.: 17/296,844

(22) PCT Filed: Nov. 20, 2019

(86) PCT No.: PCT/US2019/062402

§ 371 (c)(1),
(2) Date: May 25, 2021

(87) PCT Pub. No.: WO2020/112459

PCT Pub. Date: Jun. 4, 2020

(65) Prior Publication Data

US 2022/0018155 A1 Jan. 20, 2022

Related U.S. Application Data

(60) Provisional application No. 62/773,516, filed on Nov. 30, 2018.

(51) Int. Cl.
*E05B 9/08* (2006.01)
*E05B 47/00* (2006.01)
(Continued)

(52) U.S. Cl.
CPC ............ *E05B 9/08* (2013.01); *E05B 47/0012* (2013.01); *E05B 47/0673* (2013.01);
(Continued)

(58) Field of Classification Search
CPC .. E05B 47/06; E05B 47/0603; E05B 47/0657; E05B 47/0665; E05B 47/0673; E05C 3/042
See application file for complete search history.

(56) References Cited

U.S. PATENT DOCUMENTS 5,931,430 A 8/1999 Palmer
6,116,066 A * 9/2000 Gartner .................. E05B 47/06
70/432
(Continued)

FOREIGN PATENT DOCUMENTS

CN 1550629 A 12/2004
DE 202016005817 U1 1/2018
(Continued)

OTHER PUBLICATIONS

"SC—Self Contained Electronic Locking System", Southco, Retrieved from the Internet on May 21, 2021 at https://www.southco.com/en-us/sc, 5 pages.
(Continued)

*Primary Examiner* — Alyson M Merlino
(74) *Attorney, Agent, or Firm* — Buchanan Ingersoll & Rooney PC

(57) ABSTRACT

A panel-mounted latch module includes a cable extending from a housing of the latch module to deliver either power or signals either to or from the latch module. A rotatable member is rotatably connected to the housing. A pawl is mounted to the rotatable member and is moveable between a locked position to prevent access to the secured area and an unlocked position to permit access to the secured area. A sleeve is fixed to the housing and at least partially surrounds the rotatable member, such that the rotatable member rotates with respect to the sleeve. A fastener is configured to be mounted to the sleeve for attaching the latch module to the panel. A washer is positioned between the fastener and the
(Continued)

panel. The washer has a channel through which the cable passes so as to either limit or prevent the fastener from compressing the cable.

17 Claims, 8 Drawing Sheets

(51) Int. Cl.
*E05B 47/06* (2006.01)
*E05C 3/04* (2006.01)

(52) U.S. Cl.
CPC ...... *E05C 3/042* (2013.01); *E05B 2047/0059* (2013.01); *E05B 2047/0094* (2013.01)

(56) References Cited

U.S. PATENT DOCUMENTS

| | | | | |
|---|---|---|---|---|
| 6,641,236 | B2 | 11/2003 | Grudzien | |
| 6,851,291 | B2 * | 2/2005 | Nunez | E05B 47/0673 70/150 |
| 7,125,057 | B2 | 10/2006 | Coleman et al. | |
| 8,141,400 | B2 * | 3/2012 | Sorensen | E05B 47/068 70/277 |
| 9,536,359 | B1 | 1/2017 | Gokcebay | |
| 9,631,399 | B1 * | 4/2017 | Zhang | E05B 47/0673 |
| 10,267,063 | B2 * | 4/2019 | Lin | E05B 47/06 |
| 2007/0284893 | A1 | 12/2007 | Davies | |
| 2009/0308118 | A1 * | 12/2009 | Antonucci | E05B 47/0657 70/277 |
| 2016/0208518 | A1 * | 7/2016 | Roatis | E05B 47/0603 |

FOREIGN PATENT DOCUMENTS

| | | | | |
|---|---|---|---|---|
| DE | 202016005818 | U1 | | 1/2018 |
| EP | 0905338 | A1 | | 3/1999 |
| JP | 3060832 | U | | 9/1999 |
| KR | 101827263 | B1 | * | 2/2018 |
| WO | 2009109972 | A1 | | 9/2009 |
| WO | 2014186475 | A1 | | 11/2014 |
| WO | 2018054528 | A2 | | 3/2018 |

OTHER PUBLICATIONS

"ML51PA—Digital PIN Keypad Cam Lock", ASSA ABLOY Opening Solutions, retrieved from the Internet on May 21, 2021, https://www.assaabloy.com.au/en/local/au/assa-abloy-products/assa abloy-products/digital-cam-locks/ml51pa-digital-keypad-cam-lock/, 4 pages.

Provisional Application for U.S. Appl. No. 62/681,945, filed Jun. 7, 2018, 57 pages. 2021.

International Search Report and Written Opinion for International Application No. PCT/US2019/062402, mailed Feb. 14, 2020, 17 pages.

Chinese Office Action for Chinese Application No. 201980078623.1, dated May 27, 2022, with translation, 14 pages.

International Preliminary Report on Patentability for International Application No. PCT/US2019/062402, dated May 25, 2021, 12 pages.

* cited by examiner

ELECTROMECHANICAL HANDLE LOCKING CAM LATCH WITH KEYED MECHANICAL OVERRIDE

This application is a U.S. national phase application filed under 35 U.S.C. § 371 claiming benefit to International Patent Application No. PCT/US2019/062402, filed Nov. 20, 2019, which is related to, and claims the benefit of priority from, U.S. Provisional Application No. 62/773,516, titled ELECTROMECHANICAL HANDLE LOCKING CAM LATCH WITH KEYED MECHANICAL OVERRIDE, filed 30 Nov. 2018, the contents of which are incorporated herein by reference in their entirety for all purposes.

FIELD OF THE INVENTION

The present disclosure relates generally to systems for providing controlled access to a secure area, and more specifically to electronic access systems.

BACKGROUND OF THE INVENTION

Electronic access systems are used to control access to secured areas, including but not limited to data centers, research labs, vaults, storage areas, and other types of enclosures. Some systems feature one or more latches, where each latch facilitates the unlocking and locking of a panel, door or other structure that controls access to the secured area. These latches sometimes include built-in user interfaces, or "readers", that receive an input from a user seeking to access the secure area. Depending on the type of input, the input may be converted to a signal and sent to a controller. If the user's input is accepted, the controller will send a signal to unlock each latch. Advancements in the area of electronic access systems are continually sought in the interests of performance, security, cost, and operability.

BRIEF DESCRIPTION OF THE DRAWINGS

The foregoing summary and the following description will be better understood in conjunction with the non-limiting examples shown in the drawing figures, of which.

DETAILED DESCRIPTION OF THE INVENTION

Figure 3:
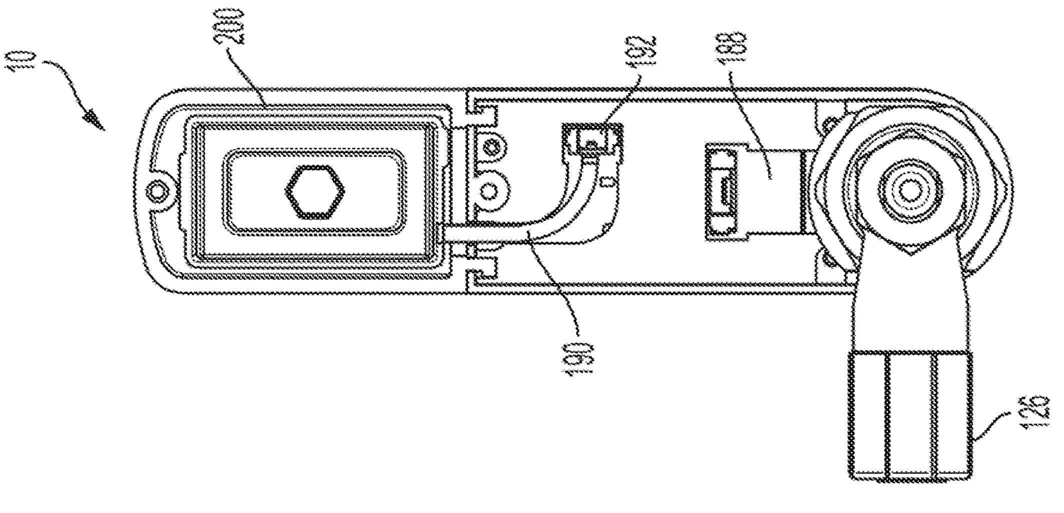
FIG. 3 is a bottom plan view of the access system of FIG. 1.
Figure 2:
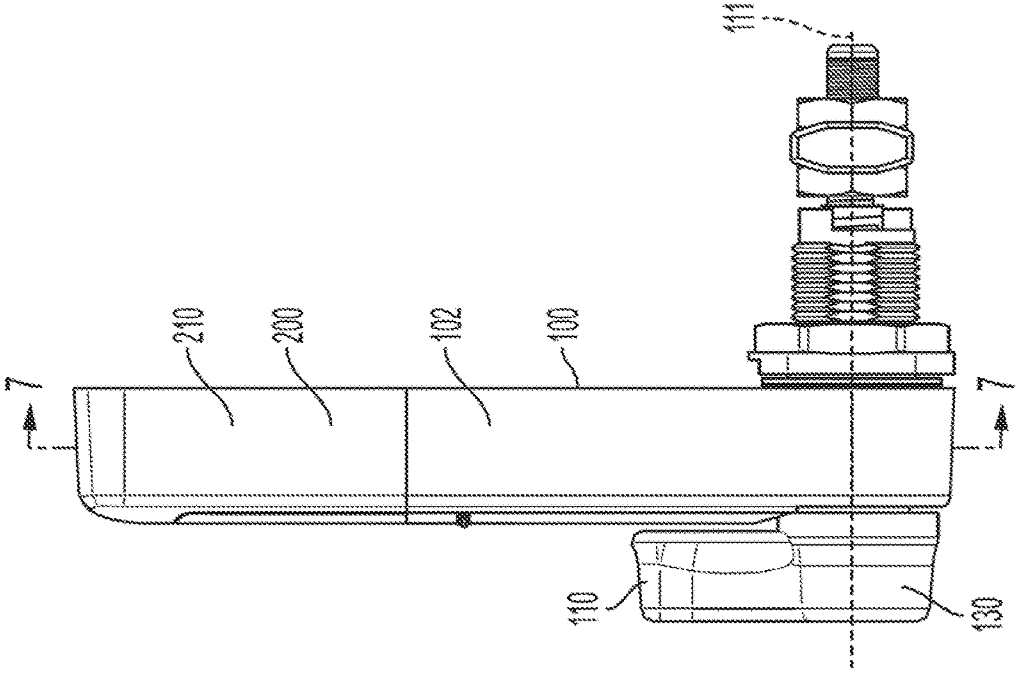
FIG. 2 is a side elevation view of the access system of FIG. 1.
Figure 1:
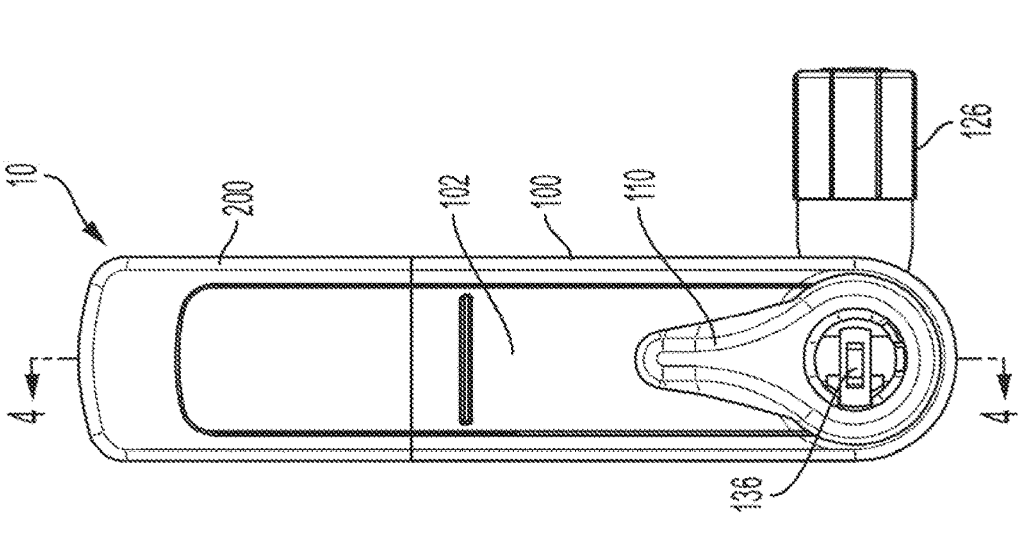
FIG. 1 is a top plan view of an electronic access system in accordance with one exemplary embodiment of the present disclosure.

Although the present disclosure describes and illustrates specific embodiments, the present disclosure is not intended to be limited only to the details and arrangements shown. Various modifications may be made to the details and arrangements shown in the present disclosure, and the full range of equivalents, without departing from the scope of the present disclosure.

Referring to FIGS. 1-9, an electronic access system 10 for providing controlled access to a secure area is disclosed. The system 10 generally includes a latch module 100 and a reader module 200 that is secured to the latch module 100. Latch module 100 is configured for mounting to a panel 160 that provides access to a secure area. The panel of the closure is disclosed in FIGS. 10A and 10B.

Once installed to the panel 160, latch module 100 is operable in two different modes to control access to the secure area. In particular, latch module 100 is operable in a locked mode to lock a panel and prevent access to the secure area. Latch module 100 is also operable in an unlocked mode to unlock the panel and allow access to the secure area.

The reader module 200 is connected to latch module 100 by a sliding mechanism (such as disclosed in U.S. Patent App. No. 62/681,945) or fasteners, for example. Reader module 200 includes a housing 210 having a hollow interior in which an authentication mechanism is at least partially positioned. The authentication mechanism may be, for example, an RFID reader that is operable to receive data from a user's RFID tag or transponder. Alternatively, the authentication mechanism may include a keypad, a biometric scanner, a card slot, or any other device that is known to those skilled in the art for either single factor or dual factor authentication. Further details regarding the reader module are described in U.S. Patent App. No. 62/681,945 to Southco, Inc., which is incorporated by reference herein in its entirety.

Referring now to individual features of the latch module 100, latch module 100 includes a housing 102 defining an interior space for accommodating various components of the system 10, and the handle 110 that is rotatably mounted to the front face of housing 102. The handle 110 has an elongated body that defines a longitudinal axis 111 about which the handle 110 can rotate with respect to housing 102. Handle 110 has an elongated portion 120 extending along and at least partially defining longitudinal axis 111 and a handle portion 130 for gripping. It should be understood that the geometry and structure of the handle portion 130 may vary, and could be round, for example.

Figure 4:
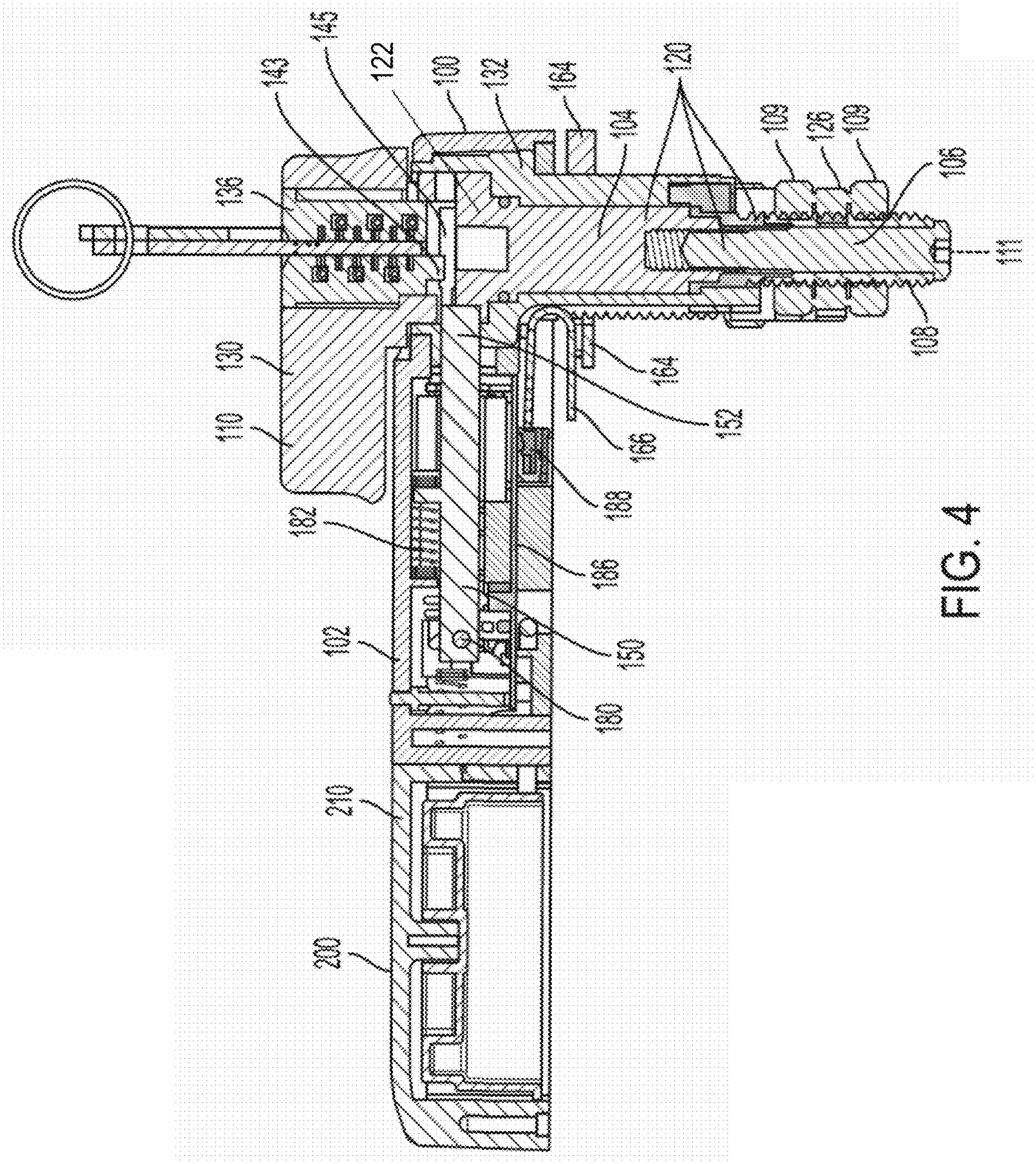
FIG. 4 is a cross-sectional view of the access system of FIG. 1 taken along the lines 4-4.

As best shown in FIG. 4, the elongated portion 120 is a rotatable member to which the pawl 126 is connected that is configured to rotate about axis 111. The rotatable member comprises a sleeve 104 that extends from the handle portion 130, a post 106 having male threads that is connected to female threads of the sleeve 104, and another sleeve 108 having male threads that surrounds the post 106. It should be understood that the rotatable member may vary from that which is shown and described.

Handle portion 130, which is connected to front side 122 of housing portion 120, can be manually operated to open the panel 160 when latch module 100 is in the unlocked mode. Handles in accordance with the present disclosure may take the form of an L-handle (as shown), a T-handle, a swing handle or other type of handle which can be manually operated to open and close the closure.

A latch arm or pawl 126 is fixed to the male threads of the sleeve 108 of the elongated portion 120 and is sandwiched between two nuts 109 such that the pawl 126 is configured to rotate along with the handle portion 130. Pawl 126 is rotatable to a locked position when latch module 100 is in the locked mode, and an unlocked position when the latch module is in the unlocked mode. The panel 126 rotates along with the handle 110. FIGS. 1-9 show pawl 126 in the locked position. Pawl 126 can be rotated ninety degrees from the locked position shown to an unlocked position. It should be understood that the panel 126 engages with an opening to which the panel 160 is moveable attached. In the locked position of the panel 126, the panel 160 is locked to the opening.

Figure 7:
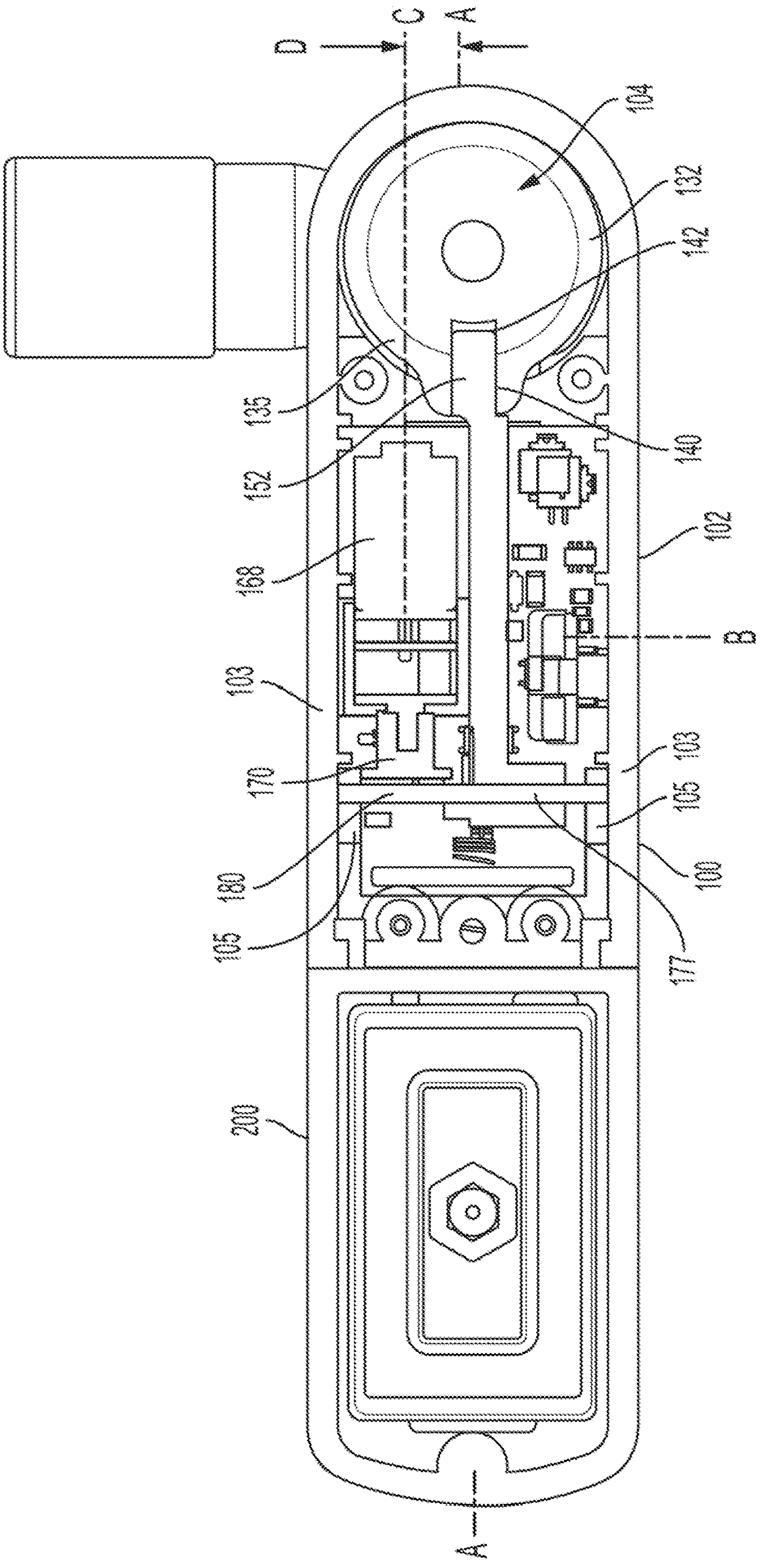
FIG. 7 is a cross-sectional view of the latch module of FIG. 2 taken along the lines 4-4.
Figure 8:
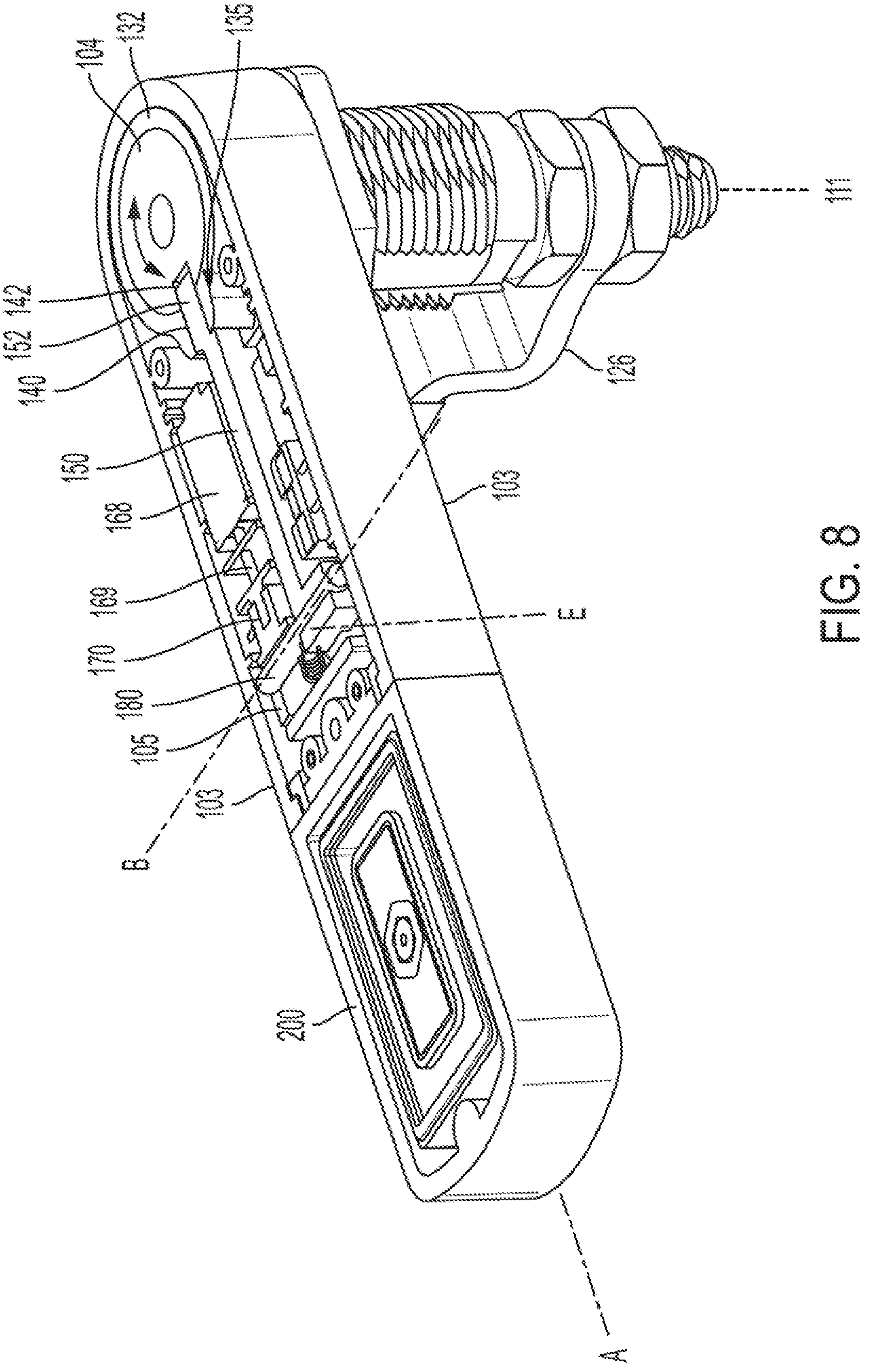
FIG. 8 is an isometric view of the cross-section of the access system of FIG. 7 shown slightly rotated.

Referring still to components of latch module 100, a cylindrical and hollow sleeve 132 surrounds the outer surface of the sleeve 104. The sleeve 132 is fixedly mounted to housing 102 such that sleeve 132 does not rotate along with handle 110. In other words, sleeve 104, post 106, sleeve 108 and pawl 126 rotate together with respect to the stationary sleeve 132. A portion of the sleeve 132 is positioned within the housing 102, and a portion of the sleeve 132 extends outside of the housing 102. As best shown in FIGS. 7 and 8, the top end of exterior surface of the sleeve 132 that extends inside of the housing 102 includes an outwardly extending cam-lobe shaped surface 135. The cam-lobe shaped surface 135 is mounted within a recess to prevent rotation of the sleeve 132 with respect to housing 102.

As best shown in FIGS. 4-6, 10B and 10A, the portion 137 of the sleeve 132 that extends outside of the housing 102 has a non-circular and double "D" shaped outer perimeter that compliments the non-circular and double "D" shaped hole 162 in the panel 160. The double "D" shaped hole 162 may also be referred to herein as a pre-sized aperture. Engagement between the non-circular hole 162 and the non-circular portion 137 of the sleeve 132 prevents rotation of the sleeve 132 and the housing 102 about axis 111 with respect to the panel 160. Those skilled in the art will recognize that other geometries are known to prevent relative rotation, such as any non-circular shape.

The exterior surface of the portion 137 of the sleeve 132 includes two opposing flat portions 139 and two opposing rounded portions. The rounded portions include male threads 141 for receiving a nut 163 (shown schematically in FIG. 6 only) for mating the sleeve 132 (along with the entire latch module 100) to the panel 160 in order to prevent axial movement of the latch module 100 with respect to the panel 160. In an assembled configuration, a washer 164 is sandwiched between the nut 163 and the panel 160. It should be understood that the panel 160 abuts the underside surface of the housing 102. The nut 163 is also referred to herein as a fastener.

The washer 164 has a top side surface facing the panel 160 and a bottom side surface facing the nut 163. The washer 164 has a non-circular and double "D" shaped interior opening. In an assembled configuration, the flat side walls of the interior opening of the washer 164 are radially aligned with respective flat portions 139 of the sleeve 132 and the hole 162 in the panel 160.

The washer 164 includes an axially extending cut-out, depression, recess or channel 165. The channel 165 is radially aligned with the flat part of its double "D" shaped interior opening. The channel 165 is formed on the top side surface of the washer 164. The channel 165 has a depth sized to accommodate the thickness of cable 166 that extend from the latch module 100. The cable 166 is routed through the hole 162 in the panel 160, between the flat of the hole 162 in the panel 160 and the flat side wall of the opening in the washer 164, along the length of the channel 165 in the washer 164 and in a direction toward a connection point. The washer 164 prevents the cable 166 from becoming crushed between the panel 160 and the nut 163 that is used to connect the sleeve 132 to the panel 160.

Referring now to FIGS. 7 and 8, a rectangular opening 140 extends radially through the wall thickness of the cam-lobe shaped surface 135 of the stationary sleeve 132. The opening 140 is substantially aligned with the major axis A (see FIG. 7) of housing 102. The top end of the sleeve 104 also includes a blind opening 142 formed in the exterior surface. In the rotational position of the sleeve 104 corresponding to the locked state of the latch module 100, which is shown in FIGS. 7 and 8, the openings 140 and 142 are radially aligned and register with one another to receive a locking end 152 of a lock bar 150. The locking end 152 of the lock bar 150 prevents rotation of the sleeve 104 (as well as the entire handle 110) when the end 152 is positioned within the openings 140 and 142.

The latch module 100 includes various components for moving the lock bar 150 back and forth to accomplish locking and unlocking of the latch module 100, and those components are positioned within the interior of housing 102. More particularly, referring now to FIGS. 7-9, a motor 168 is fixed to the housing 102. Motor 168 includes an output shaft 169 that is capable of rotation in at least one rotational direction. The output shaft 169 is non-rotatably coupled to a cam device 170, such that the cam device 170 rotates along with the output shaft 169. The cam device 170 includes two teeth 171 (see FIG. 9) each having ramped surfaces, and a space formed between the teeth 171. As best shown in FIG. 7, the cam device 170 and the output shaft 169 extend along axis C, which is parallel to and offset from the major axis A of the housing 102 by a distance D.

Figure 9:
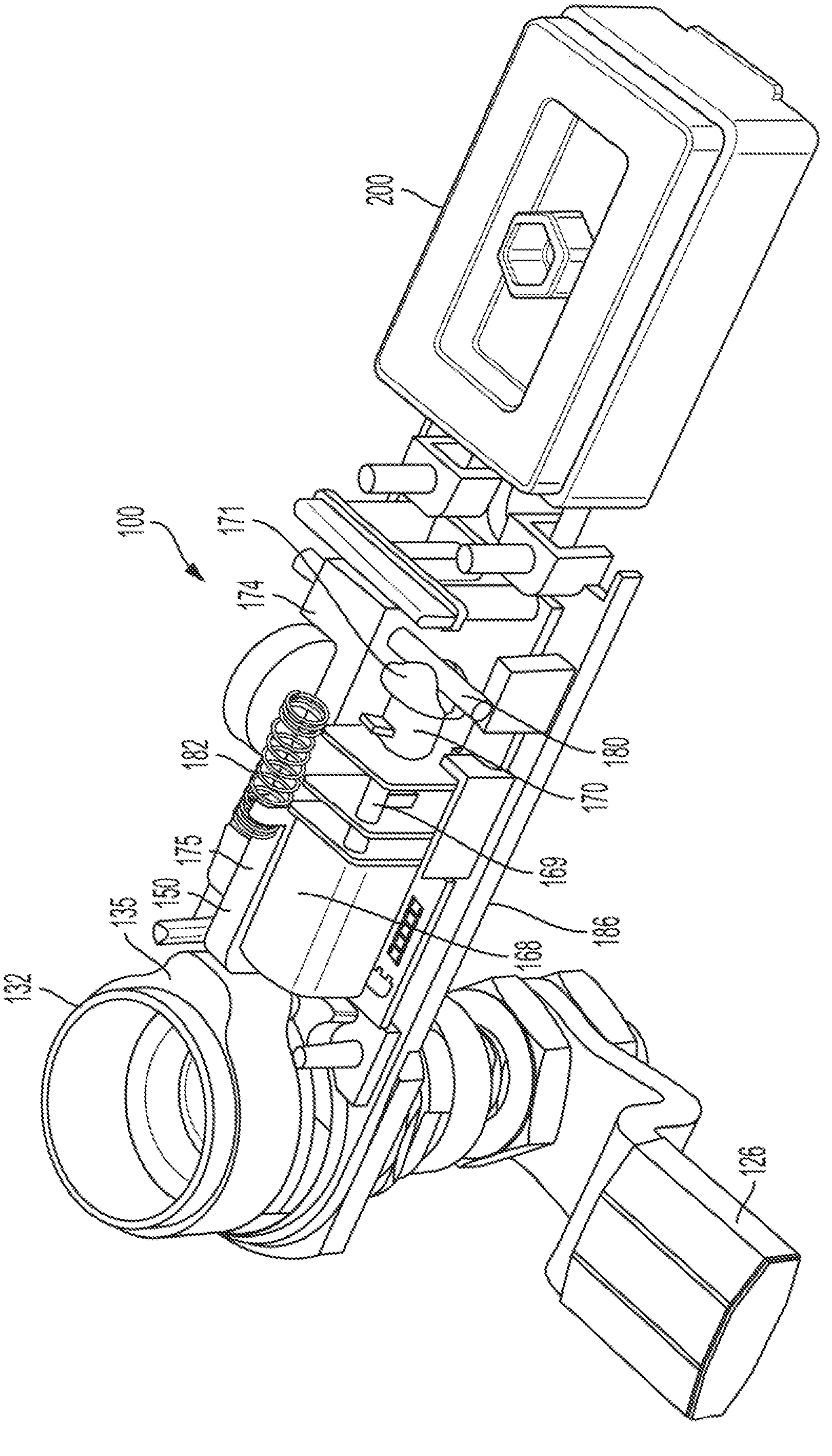
FIG. 9 is an isometric view of the system of FIG. 7 wherein various components are omitted to reveal internal features of the system.
Figure 10B:
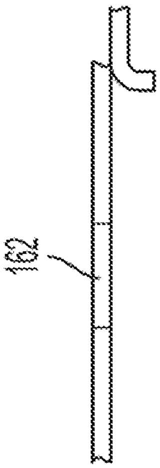
FIG. 10B is a cross-sectional view of the panel of FIG. 10A taken along the lines 10B-10B.
Figure 10A:
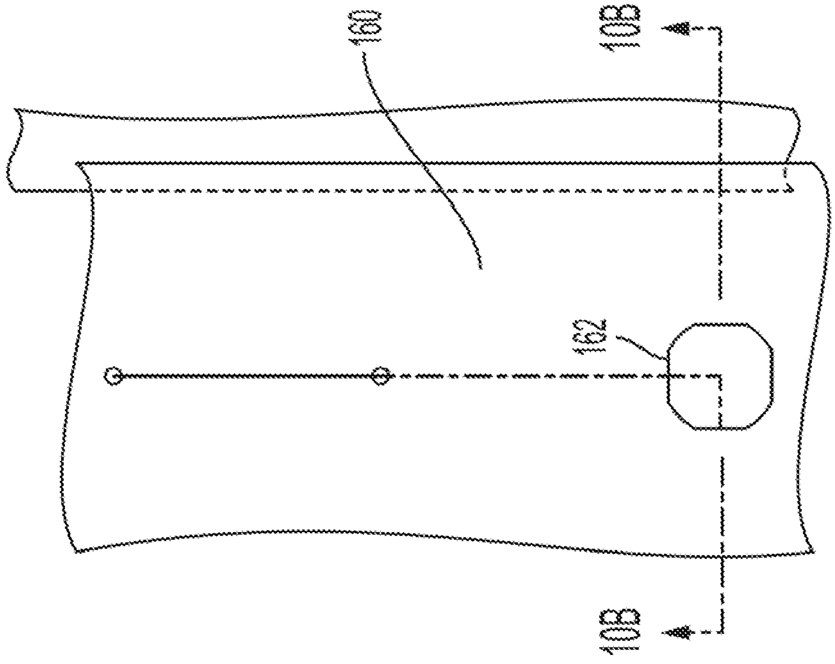
FIG. 10A is a front elevation view of a panel to which the access system of FIG. 1 can be attached.

As best shown in FIG. 9 the lock bar 150 has a follower end 174 that is positioned adjacent the cam device 170. The above-described locking end 152 (obscured in FIG. 9 by sleeve 132) is opposite the follower end 174. A central portion 175 extends between the follower end 174 and the locking end 152. The lock bar 150 is configured to translate in a direction along the major axis A of the housing 102. The width of the follower end 174 of lock bar 150 is greater than that of the central portion 175 of the lock bar 150. The follower end 174 extends from the central portion 175 in a first lateral direction that is parallel to the minor axis B of the housing 102, whereas the locking end 152 extends from the central portion 175 in an opposite lateral direction along the minor axis B. It should be understood that the minor axis B is orthogonal to the major axis A. The locking end 152 is aligned with the major axis A of the housing, whereas the follower end 174 and the central portion 175 are offset from the major axis A.

A hole 177 is formed in the follower end 174 and extends in a direction parallel to the minor axis B. The hole 177 is sized to accommodate a pin 180, and the pin 180 is immovably mounted to the hole 177 by way of a friction fit, for example. The pin 180, which is a cam follower, is mounted in the follower end of the lock bar 150.

One end of the pin 180 extends from the follower end 174 of the lock bar 150. That end of the pin 180 is engaged with the teeth 171 of the cam device 170. Specifically, the end of the pin 180 bears on and meshes with the teeth 171. The pin 180 constitutes a cam follower, whereas the teeth 171 constitutes cams that rotate to cause translation of the pin 180.

The axis C of the cam device 170, which provides the input force to the lock bar 150, is offset from the major axis A. Offsetting the cam device 170 from the major axis A results in a latch module 100 having minimal dimensions along both major axis A and minor axis B. Accordingly, the latch module 100 has a small footprint as compared with other competitive latch modules. However, it can be envisioned that the aforementioned offset D could cause the pin 180 to become dislodged in the housing 102. Accordingly, as best shown in FIG. 8, the ends of the pin 180 travel in respective grooves 105 formed in the opposing sidewalls 103 of the housing 102 and (optionally) slide along the sidewalls 103. The sidewalls 103 and the grooves 105, which extend in a direction parallel to the major axis A, prevent the pin 180 from rotating about an axis that is parallel to axis 111 and becoming dislodged.

The pin 180 and the lock bar 150 are biased by a spring 182 toward the sleeve 132 and the locked position, which is shown in FIGS. 1-9. One end of the spring 182 is mounted to a fixed point in the housing 102, and the other end of the spring 182 is mounted to a flange 184 (see FIG. 6) on the lock bar 150.

Figure 6:
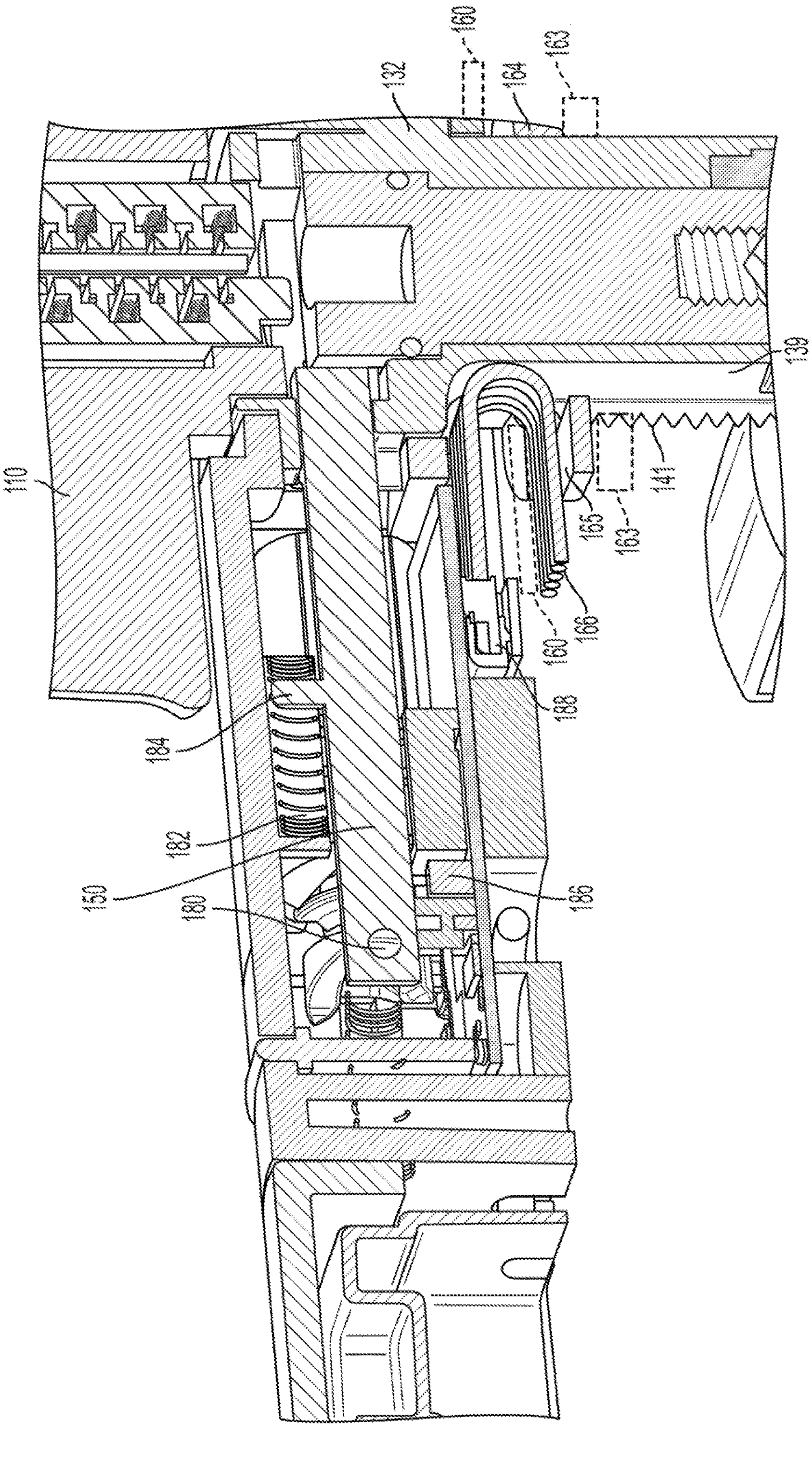
FIG. 6 is a detailed view of the isometric view of FIG. 5.

Referring now to FIGS. 3 and 6, a circuit board 186 is fixedly mounted to the housing 102 and resides beneath the lock bar 150. The motor 168 is mounted to the circuit board 186 and receives power from electronic components mounted to the circuit board 186. The circuit board 186 includes a clock, processor and/or controller for controlling operation of the motor 168. A proximity sensor may be mounted to the board 186 for sensing the position of either the output shaft of the motor 168, the cam device 170 or the lock bar 150 to understand whether the lock bar 150 is either in a locked or an unlocked configuration. The electronic components mounted to the circuit board 186 receive power and/or signals from a controller (not shown), which is remote from the system 10. Specifically, a connector 188 is mounted to the bottom side of the circuit board 186 for communicating with the electronic components mounted to the circuit board 186. One end of the cable 166, which comprises a plurality of wires (for example), is connected to the connector 188, and the opposite end of the cable 166 is attached either directly or indirectly to the external controller (not shown). The external controller delivers power and signals to the circuit board 186 by way of the cable 166. Alternatively, the cable 166 may be omitted, and a wireless transmitter/receiver may be mounted to the circuit board for transmitting and receiving signals to/from the external controller.

As best shown in FIG. 3, a second cable 190 extends between and electrically connects the reader module 200 to the latch module 100 to deliver power and signals between the reader module 200 and the latch module 100. Specifically, one end of the cable 190 is mounted to a circuit board (or other device) within the reader module 200, and the opposite end of the cable 190 is mounted to a connector 192 that is mounted to the circuit board 186.

In operation of the access system 10, the reader module 200 receives a user's authentication information in the form of a signal transmitted by the user's RFID tag, a combination entered by the user into the keypad, the user's fingerprint, etc. The reader module 200 transmits that authentication information in the form of a signal via the second cable 190 to the latch module 100, which, in turn, transmits that authentication information through the cable 166 to an external controller (not shown). The external controller may or may not form part of the electronic access system 10.

The external controller determines the validity of the authentication information. The external controller may utilize an open authentication method, meaning that an external data source confirms the user's identity. The external data source could be, for example, Microsoft Active Directory, an OAuth or an LDAP-compliant source.

If the authentication information is not valid, then the external controller transmits a rejection signal through the cable 166 to the latch module 100, which transmits a signal through the second cable 190 to a processor in the reader module 200. The processor transmits a signal to a visual and/or audible device, such as an LED, display or speaker, on the reader module 200. The visual or audible device consequently displays or announces to the user that the authentication information is not valid. It should be understood that the visual and/or audible device may alternatively be provided on the latch module 100.

Alternatively, if the authentication information is valid, then the external controller transmits a validation signal through the cable 166 to the latch module 100. Upon receiving the validation signal, the processor and/or a controller on the circuit board 186 of the latch module 100 activates the motor 168. Consequently, the output shaft of the motor 168 rotates by a predetermined rotational angle, which causes the cam device 170 to rotate, which causes the pin 180 (along with the lock bar 150) to ride along the teeth 171 of the cam device 170. The pin 180 translates along axis A in a direction away from the sleeve 104 and against the bias of the spring 182. Rotation of the output shaft of the motor 168 may be sensed by a proximity sensor located on the circuit board, for example. The end 152 of the lock bar 150 withdraws from the opening 142 in the sleeve 104 (and, without withdrawing from the opening 140 in the sleeve 132). At this stage, the sleeve 104 is free to rotate about axis 111, and the user may rotate the handle 110 and the pawl 126 to the unlocked position.

After a predetermined time duration has elapsed (as determined by the processor on the board 186, for example), the processor and/or controller on the circuit board 186 transmits a signal to cause the output shaft of the motor 168 to rotate by a predetermined rotational angle in either the same rotational direction or an opposite rotational direction, as detected by the proximity sensor, which causes the cam device 170 to rotate, which causes the pin 180 (along with the lock bar 150) to ride along the teeth 171 of the cam device 170 and translate along axis A in a direction toward the sleeve 104 due to the bias of the spring 182. If the opening 142 of the sleeve 104 is not radially aligned with the end 152 of the lock bar 150 (because the handle 110 is rotated in an open state), then the end 152 will bear on the outer circumference of the sleeve 104 by the bias of the spring 182. More particularly, upon rotating the handle 110 from the open state to the closed state, the end 152 rides along the outer circumference of the rotating sleeve 104. Once the handle 110 reaches the closed state, the opening 142 in the sleeve 104 becomes radially aligned with the end 152 of the lock bar 150, and the spring 182 urges the end 152 of the lock bar 150 into the opening 142 of the sleeve 104, thereby locking the handle 110 and the pawl 126 in the locked state.

The latch module 100 in accordance with the present disclosure can be unlocked in response to instructions received from the external controller, as noted above. In addition, the latch module 100 includes one or more backup mechanisms for unlocking. Specifically, latch module 100 includes a key lock 136 as a backup mechanism. Alternatively, latch module 100 can include a different backup mechanism, such as a card slot, chip reader, or hasps for securing a standard or customized pad lock to the latch module.

Figure 5:
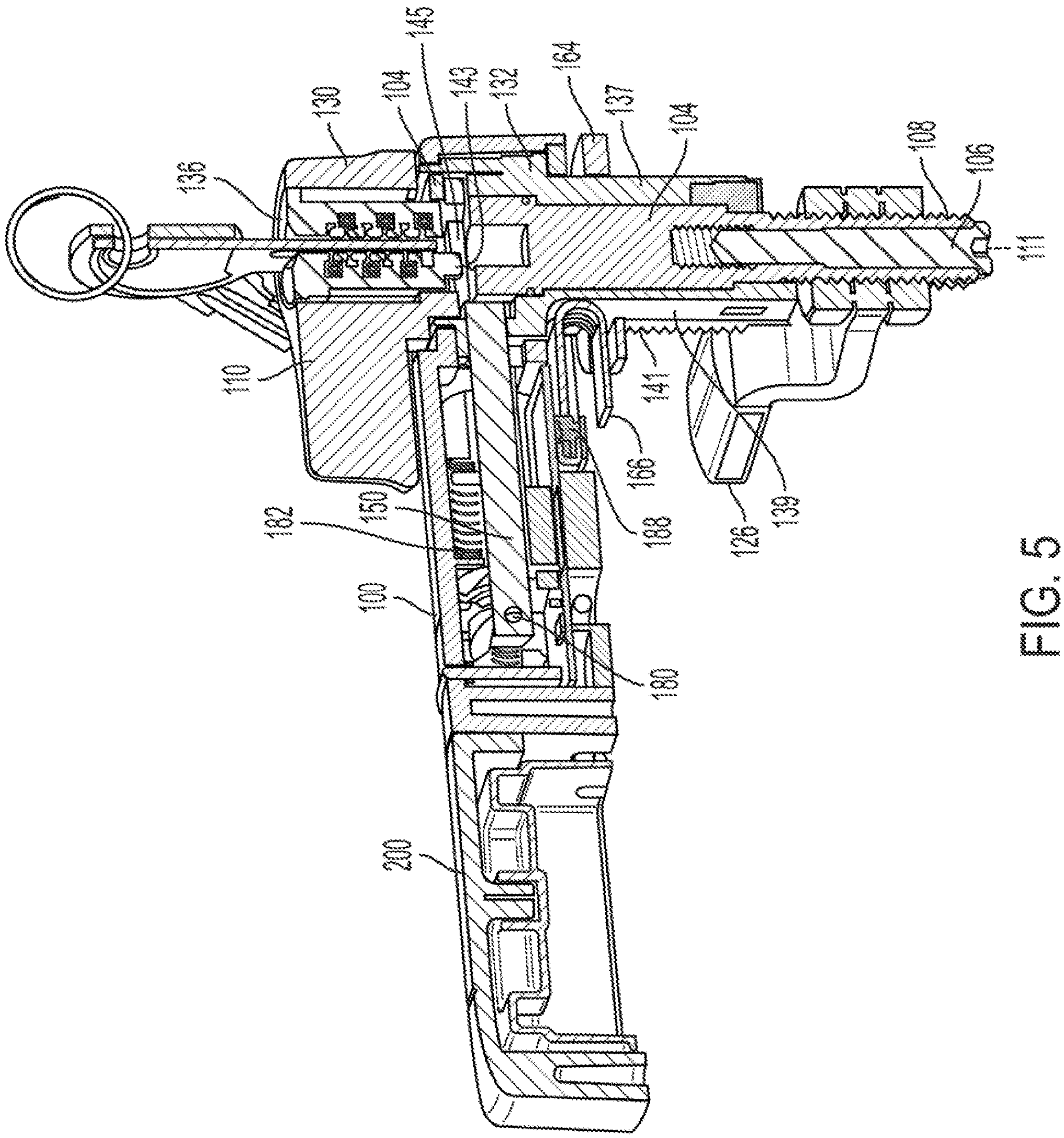
FIG. 5 is an isometric view of the cross-section of the access system of FIG. 4 shown slightly rotated.

Referring now to FIGS. 4 and 5, the latch module 100 includes a key lock 136 that is disposed in an opening formed on a front face of the handle 110. The key lock 136 is operable to rotate from a locked orientation to an unlocked orientation to manually move the lock bar 150 to the unlocked position. The key lock 136 includes a mechanical lock cylinder adapted to receive a key to rotate the key lock to the unlocked orientation and thereby move the lock bar 150 to the unlocked condition. In this arrangement, the key lock 136 can be used to unlock latch module 100 when the controller or other components of the electronic access system are disabled.

In operation, upon inserting the proper key into the mechanical lock cylinder of the key lock 136 and rotating the key in the lock cylinder, a post 143 at the lower end of the mechanical lock cylinder rotates along with the body of the lock cylinder. Rotation of the post 143 cause a plate 145 to translate toward the end 152 of the lock bar 150 and translate the end 152 out of the opening 142 in the sleeve 104 (and, without withdrawing from the opening 140 in the sleeve 132). At this stage, the sleeve 104 is free to rotate about axis 111, and the user may rotate the handle 110 and the pawl 126 to the unlocked position.

In one exemplary use of the access system 10, the access system 10 may be applied to an enclosure. Details of one example of an enclosure are described in U.S. Pat. No. 6,641,236, which is incorporated by reference herein in its entirety. The enclosure may have a housing defining an opening. A moveable panel may be mounted to the housing and movable between an open position in which the moveable panel does not conceal the opening and a closed position in which the moveable panel conceals the opening. The moveable panel may be in the form of a door or drawer, for example. The access system 10 is fixed to the moveable panel. The latch module 100 of the access system 10 is configured to alternately lock and unlock the panel with respect to the housing while the panel is maintained in the closed position.

Latch modules and reader modules shown and described herein have a number of aesthetic and ornamental features that are not dictated by function or purpose. These aesthetic and ornamental features, which can be varied and changed without affecting the function or purpose of the latch modules and reader modules, include but are not limited to, the shape, color, surface texture, relative dimensions, opacity, transparency, translucency, and light intensity, where applicable, of the latch module alone, or the reader module alone, the latch module and reader module when assembled.

While specific embodiments of the invention have been shown and described herein, it will be understood that such embodiments are provided by way of example only. Numerous variations, changes and substitutions will occur to those skilled in the art without departing from the present disclosure. Accordingly, it is intended that the appended claims cover all such variations, and that all such variations fall within the scope of the present disclosure.

What is claimed is:

1. A latch module for an electronic access system that provides controlled access to a secure area, the latch module being configured for mounting to a panel defining a pre-sized aperture without modifying the size of the pre-sized aperture, the latch module comprising:

a housing at least partially defining an interior space;

a cable extending from the interior space of the housing and being connected to the latch module to deliver either power or signals either to or from the latch module;

a rotatable member that is rotatably coupled to the housing;

a pawl mounted to the rotatable member, the pawl being rotatable between a locked position to prevent access to the secure area and an unlocked position to permit access to the secure area;

a sleeve that is fixed to the housing and at least partially surrounds the rotatable member, such that the rotatable member rotates with respect to the sleeve, the sleeve defining a recess positioned to accommodate the cable and through which the cable passes;

a fastener that is configured to be mounted to the sleeve for attaching the latch module to the panel; and a washer that is configured to be positioned between the fastener and the panel, the washer defining a channel positioned to accommodate the cable and through which the cable passes so as to either limit or prevent the fastener from compressing the cable;

wherein the recess defined by the sleeve and the channel defined by the washer together form a cable passage when the recess and the channel are aligned; and wherein the pre-sized aperture defined by the cable is configured to receive the sleeve and the cable without modifying the size of the pre-sized aperture.

2. The latch module of claim 1 further comprising a circuit board connected to the housing, wherein the cable is connected to the circuit board for delivering power or signals either to or from the circuit board.

3. The latch module of claim 1, wherein the fastener is a nut that is connected to mechanical threads on the sleeve.

4. The latch module of claim 1, wherein an outer perimeter of the sleeve has a rounded portion and a flat portion, and the channel in the washer is aligned with the flat portion.

5. The latch module of claim 4, wherein the washer has a top side surface facing the panel and a bottom side surface facing the fastener, and the channel is a recess or depression that is formed in the top side surface.

6. The latch module of claim 5, wherein the recess or depression of the washer is radially aligned with the flat portion of the sleeve.

7. A latch module according to claim 6 in combination with the panel, wherein a perimeter of the pre-sized aperture includes a rounded portion and a flat portion, wherein the flat portion of the pre-sized aperture is radially aligned with the flat portion of the sleeve and the recess or depression of the washer.

8. The latch module in combination with the panel of claim 7, wherein the cable passes through a channel defined by the flat portion of the pre-sized aperture, the flat portion of the sleeve and the recess or depression of the washer.

9. A latch module for an electronic access system that provides controlled access to a secure area, the latch module comprising:

a housing defining an interior space;

a motor positioned within the interior space of the housing, the motor having an output shaft extending along a first axis;

a lock bar coupled to the motor, positioned within the interior space of the housing, and extending along a second axis offset from and parallel to the first axis, the lock bar being configured to translate from a retracted position to an extended position along the second axis by action of the motor;

a rotatable member that is rotatably coupled to the housing, the rotatable member having an opening formed in an exterior surface thereof, the opening being sized to receive a locking end of the lock bar in the extended position of the lock bar, wherein the locking end of the lock bar extends along the second axis that is parallel to and offset from the first axis; and a pawl either mounted to or extending from the rotatable member, the pawl being rotatable between a locked position to prevent access to the secure area and an unlocked position to permit access to the secure area, wherein the pawl is in the locked position when the locking end of the lock bar is positioned within the opening of the rotatable member;

a cam non-rotatably connected to the output shaft of the motor, the cam having at least one tooth having a curved surface;

a pin fixed to the lock bar, the pin being meshed with the at least one tooth of the cam such that rotation of the cam causes translation of the pin and the lock bar with respect to the opening of the rotatable member;

grooves formed in walls of the housing in which respective ends of the pin are positioned, the grooves being configured to guide the translation of the pin;

wherein the lock bar prevents rotation of the rotatable member when the lock bar is in the locked position, thereby preventing rotation of the pawl from the locked position to the unlocked position; and wherein the lock bar permits rotation of the rotatable member when the motor is activated to move the lock bar to the retracted position, thereby permitting rotation of the pawl from the locked position to the unlocked position.

10. The latch module of claim 9 further comprising a reader operable to communicate electronically with a controller, the reader receives at least one input from a user.

11. The latch module of claim 10, further comprising a circuit board positioned at least partially within the housing, wherein the circuit board includes the controller that receives the at least one input from the reader.

12. The latch module of claim 9, wherein the respective ends of the pin engage walls of the housing to prevent rotation of the pin within the housing while the pin translates in the grooves.

13. The latch module of claim 9 further comprising a spring that is configured to bias the lock bar to the retracted position, and the pin against the at least one tooth of the cam.

14. A latch module according to claim 9 in combination with a panel, wherein the latch module is configured to be mounted to an opening within the panel, and the latch module further comprises:

an outer sleeve that is fixedly mounted to the housing and at least partially surrounds the rotatable member, the outer sleeve having mechanical threads that are sized to pass through the opening in the panel, and a fastener that is configured to be mounted to the mechanical threads for mounting the outer sleeve, along with the latch module, to the panel.

15. The latch module of claim 9, wherein the lock bar includes a follower end opposite the locking end that is indirectly engaged by the output shaft of the motor, and a central segment extending between the follower end and the locking end, wherein longitudinal axes of the central segment and the locking end are parallel to and offset with respect to one another.

16. An enclosure comprising a housing defining an opening, a moveable panel movably mounted to the housing for movement between an open position, in which the moveable panel does not conceal the opening, and a closed position, in which the moveable panel conceals the opening, and the latch module of claim 9 that is fixed to the moveable panel, wherein the latch module is configured to alternately lock and unlock the panel with respect to the housing while the panel is maintained in the closed position.

17. A method of mounting a latch module of an electronic access system to a panel defining a pre-sized aperture without modifying the size of the pre-sized aperture, the latch module having a housing, a sleeve fixed to the housing, and a fastener configured to be mounted to the sleeve for attaching the module to the panel, the method comprising:

positioning the housing of the latch module adjacent the panel;

extending the sleeve of the latch module through the pre-sized aperture in the panel;

extending a cable from an interior space of the housing of the latch module through the pre-sized aperture in the panel;

extending the cable into a recess, defined in the sleeve, through which the cable passes;

positioning a washer adjacent the panel and passing the cable through a channel, defined in the washer;

aligning the recess defined by the sleeve and the channel defined by the washer to form a cable passage; and fastening the latch module to the panel using the fastener;

wherein the washer limits or prevents the fastener from compressing the cable; and wherein the method is performed without modifying the size of the pre-sized aperture.

* * * * *